US008413132B2

(12) United States Patent
Rabeler et al.

(10) Patent No.: US 8,413,132 B2
(45) Date of Patent: Apr. 2, 2013

(54) TECHNIQUES FOR RESOLVING READ-AFTER-WRITE (RAW) CONFLICTS USING BACKUP AREA

(75) Inventors: Bryan Eugene Rabeler, Keller, TX (US); Roger Harry Ingles, North Richland Hills, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 96 days.

(21) Appl. No.: 12/880,679

(22) Filed: Sep. 13, 2010

(65) Prior Publication Data

US 2012/0066465 A1 Mar. 15, 2012

(51) Int. Cl.
*G06F 9/44* (2006.01)
(52) U.S. Cl. ........ 717/169; 717/167; 717/171; 717/172; 711/143; 711/162; 714/6.3
(58) Field of Classification Search .................. 717/171, 717/172
See application file for complete search history.

(56) References Cited

U.S. PATENT DOCUMENTS

| | | | | |
|---|---|---|---|---|
| 5,274,799 | A * | 12/1993 | Brant et al. ................. | 714/6.12 |
| 5,317,720 | A * | 5/1994 | Stamm et al. ................ | 711/143 |
| 5,375,216 | A * | 12/1994 | Moyer et al. ................. | 711/123 |
| 5,548,711 | A * | 8/1996 | Brant et al. ................. | 714/5.11 |
| 5,581,729 | A * | 12/1996 | Nishtala et al. ............. | 711/143 |
| 5,829,033 | A * | 10/1998 | Hagersten et al. .......... | 711/141 |
| 5,911,779 | A * | 6/1999 | Stallmo et al. .............. | 714/6.12 |
| 6,018,747 | A | 1/2000 | Burns et al. | |
| 6,243,827 | B1 * | 6/2001 | Renner, Jr. .................. | 714/6.12 |
| 6,594,822 | B1 * | 7/2003 | Schweitz et al. ............ | 717/140 |
| 7,210,010 | B2 * | 4/2007 | Ogle ............................ | 711/162 |
| 7,350,205 | B2 * | 3/2008 | Ji .................................. | 717/172 |
| 7,366,824 | B2 * | 4/2008 | Chiang ........................ | 711/100 |
| 7,640,363 | B2 * | 12/2009 | Teodosiu et al. ............. | 709/247 |

(Continued)

FOREIGN PATENT DOCUMENTS

| | | |
|---|---|---|
| WO | 2004/031961 A1 | 4/2004 |
| WO | 2005/101200 A1 | 10/2005 |

(Continued)

OTHER PUBLICATIONS

Title: Implentation of nonstop software update for client-server applications, author: Wen-Kang Wei et al, dated: 2003, source:IEEE.*

(Continued)

*Primary Examiner* — Chameli Das
(74) *Attorney, Agent, or Firm* — Jefferson IP Law, LLP

(57) ABSTRACT

Techniques directed to an update package including a set of instructions used for, in a remote client device, creating a new data image from a base data image are provided. A method for generating an update package includes determining differences between a base data image and a new data image, generating COPY instructions corresponding to respective sections of code in the base data image, organizing the COPY instructions into a directed acyclic graph, performing cycle detection on the COPY instructions in the directed acyclic graph to detect any cycles, when a cycle is detected, identifying a COPY instruction in the detected cycle with a smallest overlapping part, removing the overlapping part from the identified COPY instruction, and generating a COPYBACK instruction including the overlapping part removed from the identified COPY instruction, and after all cycles have been detected, generating the update package based on the COPY and COPYBACK instructions.

28 Claims, 3 Drawing Sheets

U.S. PATENT DOCUMENTS

| | | | |
|---|---|---|---|
| 7,657,887 B2 * | 2/2010 | Kothandaraman et al. | 717/176 |
| 7,996,814 B1 * | 8/2011 | Qureshi et al. | 717/120 |
| 8,001,527 B1 * | 8/2011 | Qureshi et al. | 717/120 |
| 2004/0162951 A1 * | 8/2004 | Jacobson et al. | 711/143 |
| 2005/0204353 A1 * | 9/2005 | Ji | 717/168 |
| 2007/0050430 A1 | 3/2007 | Meller et al. | |
| 2008/0172571 A1 * | 7/2008 | Andrews et al. | 714/6 |
| 2009/0199042 A1 * | 8/2009 | Ishikawa et al. | 714/7 |
| 2011/0113281 A1 * | 5/2011 | Zhang et al. | 714/6.12 |

FOREIGN PATENT DOCUMENTS

| | | |
|---|---|---|
| WO | 2007/039907 A2 | 4/2007 |

OTHER PUBLICATIONS

Title: Transient versioning for consistency and concurrency in client-server systems, author: Gukal, S et al, dated: 1996, source: IEEE.*

* cited by examiner

TECHNIQUES FOR RESOLVING READ-AFTER-WRITE (RAW) CONFLICTS USING BACKUP AREA

BACKGROUND OF THE INVENTION

1. Field of the Invention

Aspects of the present invention relate to techniques for resolving Read-After-Write (RAW) conflicts. More particularly, the present invention relates to techniques for resolving the RAW conflicts using a backup area.

2. Description of the Related Art

As electronic devices advance, software has become an increasingly chief component thereof. Even after a given electronic device enters the market, the software for the electronic device may continue to evolve to address existing or new problems, add or change capabilities, etc. However, when a new software version is developed for an electronic device that is already in the market, there is need to update the software in the electronic device to the newer version. While the electronic device may be returned to the manufacturer to have its software updated to the newer version, the process is costly, inconvenient, and inefficient. Accordingly, it is desirable for the software in the electronic device to be remotely updated to the new version. However, doing so, poses many challenges since the electronic device may have limited communication capabilities and/or limited memory resources.

To address the above challenges, capabilities for remotely updating software of electronic devices to a new version have been developed that minimize the amount of data that needs to be communicated to the electronic devices. An example of these capabilities includes Firmware Over The Air (FOTA), which relies on the Firmware Update Management Object (FUMA) standard of the Open Mobile Alliance Device Management (OMA-DM) group. These capabilities rely on existing and new software being different versions of the same software and thus having a significant amount of data in common. More specifically, instead of communicating the entirety of the new software version that needs to be installed on an electronic device, only information based on a difference between the existing software version and the new software version is communicated to the electronic device. Hereafter, the existing software version is referred to as a base data image, the new software version is referred to as a new data image, and the information based on the difference between the base data image and the new data image is referred to as an update package. The update package is generated by comparing the new data image to the base data image to determine their differences. More specifically, the update package contains all the information used to change the base data image into the new data image, and is smaller than the new data image.

Once the electronic device receives the update package, the electronic device uses the update package to update its base data image into the new data image. When updating the base data image, the base data image may first be copied to a new memory location. The update package may then be applied to the copy of the base data image located in the new memory location to generate the new data image. The original base data image may then be deleted or overwritten by the new data image. However, this approach is problematic when the electronic device has limited memory resources.

To address the scenario of an electronic device with limited memory resources, the update package may be applied to the base data image in-place. In other words, the original base data image may be overwritten by the changes made to transform it into the new data image. However, applying the update package to the base data image in-place may have a serious drawback, namely Read-After-Write (RAW) conflicts. A RAW conflict exists when a COPY instruction cannot copy data from location X to location Y because some other prior COPY instruction has already overwritten the data at location X. The term "Write-Before-Read" is another phrase used in the industry for describing RAW conflicts.

RAW conflicts may be addressed when generating the update package by organizing the COPY instructions in a directed acyclic graph and running a cycle detection algorithm to discover any cycle where a RAW conflict exists and break each cycle where a RAW conflict exists in a cost-effective manner.

Each cycle where a RAW conflict exists may be broken by reducing the length of the COPY instruction with the smallest overlap and generating an ADD instruction for the data that overlaps. After breaking all cycles, the COPY instructions may be topologically sorted to generate their final ordering sequence. However, if there are many RAW conflicts, then the ADD instructions that were generated may significantly increase the size of the update package since the ADD instructions necessitate the inclusion of their corresponding code in the update package.

One technique that has been proposed to address this scenario is to remove the need for the extra ADD instructions by copying entire sectors to a backup area in memory and replacing ADD instructions with COPY instructions that refer to the backup area. However, this technique performs this transformation after an initial update package has been generated, thereby requiring a complicated second pass to generate the final update package.

Therefore, a need exists for a technique for resolving RAW conflicts that does not require the use of additional ADD instructions which increase the update package size.

SUMMARY OF THE INVENTION

An aspect of the present invention is to address at least the above-mentioned problems and/or disadvantages and to provide at least the advantages described below. Accordingly, an aspect of the present invention is to provide techniques for resolving Read-After-Write (RAW) conflicts using a backup area.

In accordance with an aspect of the present invention, a method for generating an update package based on a comparison between a base data image and a new data image, the update package including a set of instructions used for, in a remote client device, creating the new data image from the base data image is provided. The method includes determining differences between the base data image and the new data image, generating COPY instructions corresponding to respective sections of code in the base data image that can be used in creating the new data image by copying the respective sections of code into new data locations in the new data image, organizing the COPY instructions into a directed acyclic graph, performing cycle detection on the COPY instructions in the directed acyclic graph to detect any cycles, when a cycle is detected, identifying a COPY instruction in the detected cycle with a smallest overlapping part, removing the overlapping part from the identified COPY instruction, and generating a COPYBACK instruction including the overlapping part removed from the identified COPY instruction, and after all cycles have been detected, generating the update package based on the COPY and COPYBACK instructions.

In accordance with another aspect of the present invention, a method for a client device to create a new data image from a base data image based on instructions included in an update package is provided. The method includes receiving the update package, detecting COPYBACK instructions in the update package, for each COPYBACK instruction detected, copying data corresponding to the COPYBACK instructions to a backup area, and after the data corresponding to the COPYBACK instructions is copied to the backup area, performing operations on the base data image corresponding to the instructions included in the update package to create the new data image, wherein, when a COPYBACK instruction is encountered, data from the corresponding backup area is used.

In accordance with yet another aspect of the present invention, an update server apparatus for generating an update package based on a comparison between a base data image and a new data image, the update package including a set of instructions used for, in a remote client device, creating the new data image from the base data image is provided. The apparatus includes a Binary Differencing Engine (BDE) and an update encoder. The BDE determines differences between the base data image and the new data image. The update encoder generates COPY instructions corresponding to respective sections of code in the base data image that can be used in creating the new data image by copying the respective sections of code into new data locations in the new data image, organizes the COPY instructions into a directed acyclic graph, performs cycle detection on the COPY instructions in the directed acyclic graph to detect any cycles, when a cycle is detected, identifies a COPY instruction in the detected cycle with a smallest overlapping part, removes the overlapping part from the identified COPY instruction, and generates a COPYBACK instruction including the overlapping part removed from the identified COPY instruction, and, after all cycles have been detected, generates the update package based on the COPY and COPYBACK instructions.

In accordance with still another aspect of the present invention, a client device apparatus for creating a new data image from a base data image based on instructions included in an update package is provided. The apparatus includes a download agent and an update decoder. The download agent receives the update package. The update decoder detects COPYBACK instructions in the update package, copies data corresponding to the COPYBACK instructions to a backup area for each COPYBACK instruction detected, and, after the data corresponding to the COPYBACK instructions is copied to the backup area, performs operations on the base data image corresponding to the instructions included in the update package to create the new data image. When a COPYBACK instruction is encountered, data from the corresponding backup area is used.

In accordance with yet another aspect of the present invention, a computer program product comprising a computer usable medium having control logic stored therein for causing a computer to generate an update package based on a comparison between a base data image and a new data image, wherein the update package includes a set of instructions used for, in a remote client device, creating the new data image from the base data image is provided. The control logic includes first, second, third, fourth, fifth, and sixth computer readable program code means. The first computer readable program code means causes the computer to determine differences between the base data image and the new data image. The second computer readable program code means causes the computer to generate COPY instructions corresponding to respective sections of code in the base data image that can be used in creating the new data image by copying the respective sections of code into new data locations in the new data image. The third computer readable program code means causes the computer to organize the COPY instructions into a directed acyclic graph. The fourth computer readable program code means causes the computer to perform cycle detection on the COPY instructions in the directed acyclic graph to detect any cycles. The fifth computer readable program code means for causes the computer to, when a cycle is detected, identify a COPY instruction in the detected cycle with a smallest overlapping part, remove the overlapping part from the identified COPY instruction, and generate a COPYBACK instruction including the overlapping part removed from the identified COPY instruction. The sixth computer readable program code means causes the computer to, after all cycles have been detected, generate the update package based on the COPY and COPYBACK instructions.

In accordance with still another aspect of the present invention, a computer program product comprising a computer usable medium having control logic stored therein for causing a computer to create a new data image from a base data image based on instructions included in an update package is provided. The control logic includes first, second, third, and fourth computer readable program code means. The first computer readable program code means causes the computer to receive the update package. The second computer readable program code means causes the computer to detect COPYBACK instructions in the update package. The third computer readable program code means for causing the computer to, for each COPYBACK instruction detected, copy data corresponding to the COPYBACK instructions to a backup area. The fourth computer readable program code means causes the computer to, after the data corresponding to the COPYBACK instructions is copied to the backup area, perform operations on the base data image corresponding to the instructions included in the update package to create the new data image, wherein when a COPYBACK instruction is encountered, data from the corresponding backup area is used.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
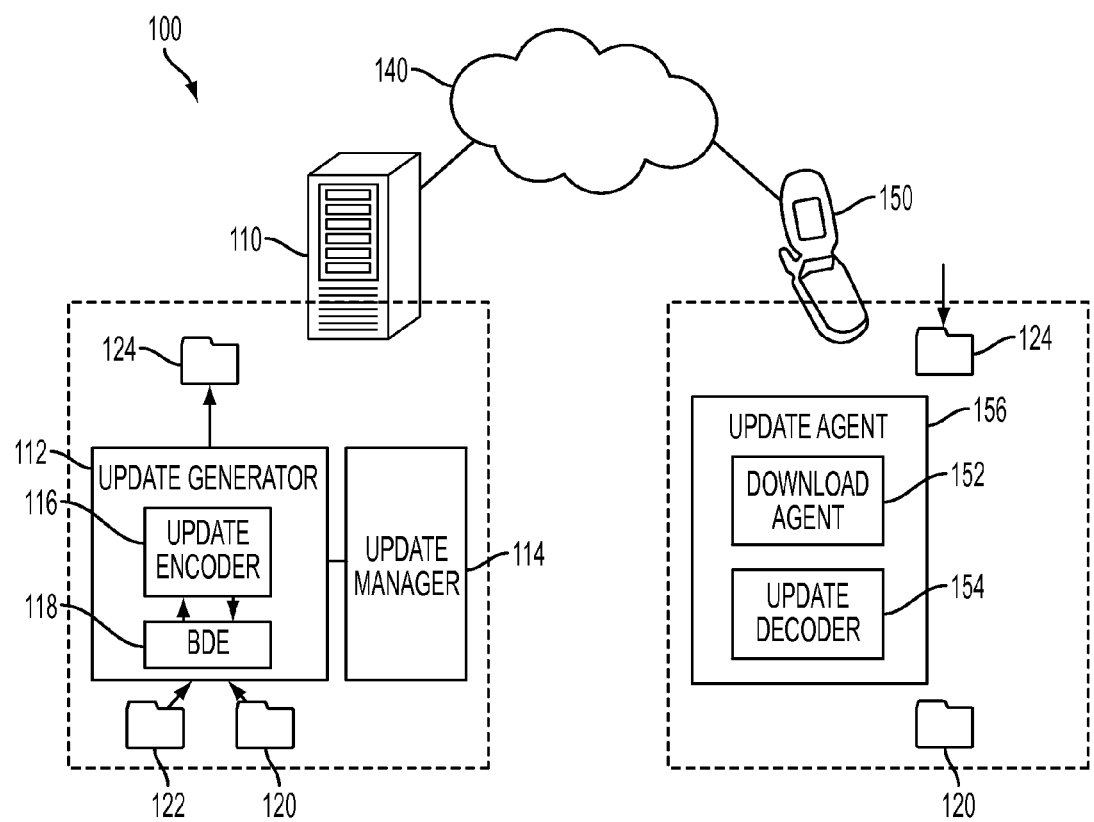
FIG. 1 illustrates a software update system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It should be understood that the following description might refer to terms utilized in various standards merely for simplicity of explanation. For example, the following description may refer to terms utilized in one of the standards established by the Open Mobile Alliance (OMA). However, this description should not be interpreted as limiting the present invention to application with any particular standard. Independent of the mechanism used to implement any of the techniques described herein, it may be advantageous for these techniques to conform to a standardized mechanism.

Exemplary embodiments of the present invention relate to techniques for remotely updating software in an electronic device. More specifically, exemplary embodiments of the present invention include techniques for resolving Read-After-Write (RAW) conflicts when generating an update package that is used for updating software in an electronic device. The term "Write-Before-Read" is another phrase used in the industry for describing RAW conflicts. The software of the electronic device may include firmware, operating code, applications or other software loaded thereon, which may collectively be referred to as "binary images", or simply "images".

Exemplary embodiments of the present invention will be described below in the context of an exemplary wireless communications system utilizing mobile handsets that may update their software in a standalone configuration. Although particularly well-suited for use in conjunction with a wireless communications system and for updating handsets used in such a system, the invention is not limited to use with such system or types of mobile devices. Use of the term "mobile handset" is in no way intended to limit the application of the present invention from use with a much broader class of client devices which may be mobile or fixed, and which may be the form of a telephone handset but may also be of any number of other form factors or varieties of devices. As such, the term "client device" as used herein denotes the broadest description possible of a class of electronic devices that can be connected to a network (whether by fixed, wireless, intermittent, removably connected or other connection) and which the software updating techniques exemplified herein may be applied, which includes, without limitation, mobile handsets, Personal Digital Assistants (PDAs), pagers, personal computers, printers and other peripheral devices. Additionally, the term "communications network" or "communications system" as used herein is used in its most expansive sense and applies to any communications system through which an update package or other information may be transferred to and from a client device, whether by static, active, dynamic communications protocols or otherwise, and includes, without limitation, anything from a single client device connected by fixed wire to a host server or computer system, or to a Local Area Network (LAN), Wide Area Network (WAN), wireless communication networks, conventional telephony, the Internet, etc. Accordingly, the disclosed updating techniques may be used in any number or type or combination of communications systems and client devices in which it is desirable to reduce the size of the update package, reduce the number of update instructions or otherwise provide more efficient updating of the binary image stored in the device. As used herein "stored" "saved" "reprogrammed" and similar terms all refer to the same process of storing a binary image in a memory device in accordance with the techniques for storing associated with the particular memory device, whether it be non-volatile flash memory, volatile Read Access Memory (RAM) or otherwise, unless specifically described otherwise.

An exemplary wireless communications system in which exemplary embodiments of the present invention may be implemented is described below with reference to FIG. 1.

FIG. 1 illustrates a software update system according to an exemplary embodiment of the present invention.

Referring to FIG. 1, the software update system 100 includes an update server 110 in communication with a client device 150 through a communications network 140. The update server 110 includes, generally, an update generator 112 and an update manager 114. While depicted as a single element, the update server 110 may alternatively be comprised of a server array or set of distributed computing devices that fulfill the purposes of the update server 110. The update generator 112 creates an update package 124 through the use of a Binary Differencing Engine (BDE) 118 and an update encoder 116. The update generator 112 maintains, or receives from an external source, a base data image 120 corresponding to the subject client device 150 and is also supplied with or obtains a copy of a new data image 122 for the subject client device 150. The BDE 118 receives a copy of the base data image 120 and a copy of the new data image 122 to be applied and, through a process of comparisons, generates lists or sets of COPYBACK, COPY, and ADD instructions which are candidate operations usable in generating the update package 124. The COPYBACK instruction is a new instruction according to exemplary embodiments of the present invention and will be described further below. The update encoder 116 communicates with the BDE 118 to combine additional encoding information to select instructions from the BDE 118 and incorporate other instructions derived from additional information to ultimately create the update package 124. In a preferred exemplary embodiment, the update encoder 116 is highly integrated with the functionality of the BDE 118 so as to enhance the optimization and apply time speed of the selected encoding instructions.

Generally, to create the update package 124 and set of update instructions including ADD, COPY and COPYBACK instructions, the BDE 118 takes two binary images, here termed the base data image 120 and the new data image 122, and by comparing the two generates COPY instructions for sections of code in the base data image 120 which can be used in creating the new data image 122 by copying such source data to the new data location in the new data image 122.

An update encoder 116 organizes the COPY instructions generated by the BDE 118 into a directed acyclic graph. The update encoder 116 performs cycle detection on the COPY instructions in the directed acyclic graph to detect any cycles. When a cycle is detected, the update encoder 116 identifies the COPY instruction in that cycle with the smallest overlap. The overlap in the COPY instruction is removed by shortening the COPY instruction and a new instruction, referred to as a COPYBACK instruction, is generated which contains only this overlapping part. The COPYBACK instruction is similar to a COPY instruction, in that it copies portions of the base image data. Thus, the overlapping part originally contained by the COPY instruction is removed from the COPY instruction and converted into the new COPYBACK instruction. This causes the cycle to be broken.

After all cycles are found, the update encoder 116 organizes the COPY instructions, including the shortened COPY instructions, into a directed acyclic graph that may be topologically sorted. The COPYBACK instructions may be maintained in a separate list. The update encoder 116 uses the COPY and COPYBACK instructions to selectively create a series or set of interleaved COPY, COPYBACK and ADD instructions. The ADD instructions constitute the portion of the new data image 122 for which suitable base image data was not identified by the BDE 118, or if identified then not selected by the encoder, for copying from the base data image 120. In other words, the update encoder 116 generates ADD instructions corresponding to respective sections the new data image 122 that cannot be or are otherwise not selected to be copied from the base data image 120.

Accordingly, the update package 124 includes the update instructions, which includes the set of COPY and COPY-BACK instructions selectively chosen as described above, ADD instructions, as well as the code strings or data sequences to be added by the ADD instructions. Thus, the update package 124, in its most basic form contains a sequence of ADD, COPYBACK and COPY instructions that can be used to recreate the new data image 122 given the base data image 120.

After the update generator 112 generates the update package 124, the update package 124, at the appropriate time or interval, is supplied to the client device 150 via the update manager 114 through the communications network 140.

Though shown singularly, the client device 150 is representative of any number of devices that may comprise a homogeneous or heterogeneous population of client devices capable of being updated by the update system 100. Each such client device 150 includes the base data image 120 constituting the software or operating code to be updated. The base data image 120 may be stored in non-volatile memory (not illustrated) of the client device 150. The client device 150 also contains an update agent 156 that is comprised of a download agent 152 for communicating with the update server 110 and receiving an update package 124 though the communications network 140. The update agent 156 further comprises an update decoder 154 that interprets and applies the update instruction set of the update package 124 in order to convert the base data image 120 into the new data image 122. Though shown schematically as two separate elements, the download agent 152 and the update decoder 154 may be parts of the same application or software, be embedded firmware or specialized hardware such as an Application Specific Integrated Circuit (ASIC), which variations and possibilities for implementing the functionalities of the download agent 152 and the update decoder 154 will be obvious to one skilled in the art. Although not illustrated, the client device 150 may include a non-volatile memory device, a controller, a RAM device, and a communications device. Also, the client device 150 may likely include, without limitation, other elements, such as a display or visual user interface element, audio input/output elements and a keypad or other input devices or peripherals, the depiction of which with the client device is not essential to the understanding of the exemplary embodiments of the present invention by one skilled in the art.

After the download agent 152 receives the update package 124 though the communications network 140, the update decoder 154 performs a first pass on the update instruction set of the update package 124. For each COPYBACK instruction, the corresponding portion of the base data image 120 is copied (using the COPY instruction's 'from' field) to a backup area in memory. These copies are performed in an order of the COPYBACK instructions in the update package 124 and a pointer to the next free location in the backup area is maintained. The update decoder 154 then performs a second pass to apply each instruction in the update package 124 to the base data image 120 to transform it into the new data image 122. When a COPYBACK instruction is encountered, instead of copying data from the base data image 120, corresponding data from the next location in the backup area is copied. Each COPYBACK instruction corresponds to its own unique data in the backup area and the locations of this data is in the same order as the COPYBACK instructions in the update package 124.

Accordingly, after the update decoder 154 applies the update instruction set of the update package 124, the base data image 120 has been converted into the new data image 122.

A method for generating the update package 124 at the update server 110 is described below with reference to FIG. 2.

Figure 2:
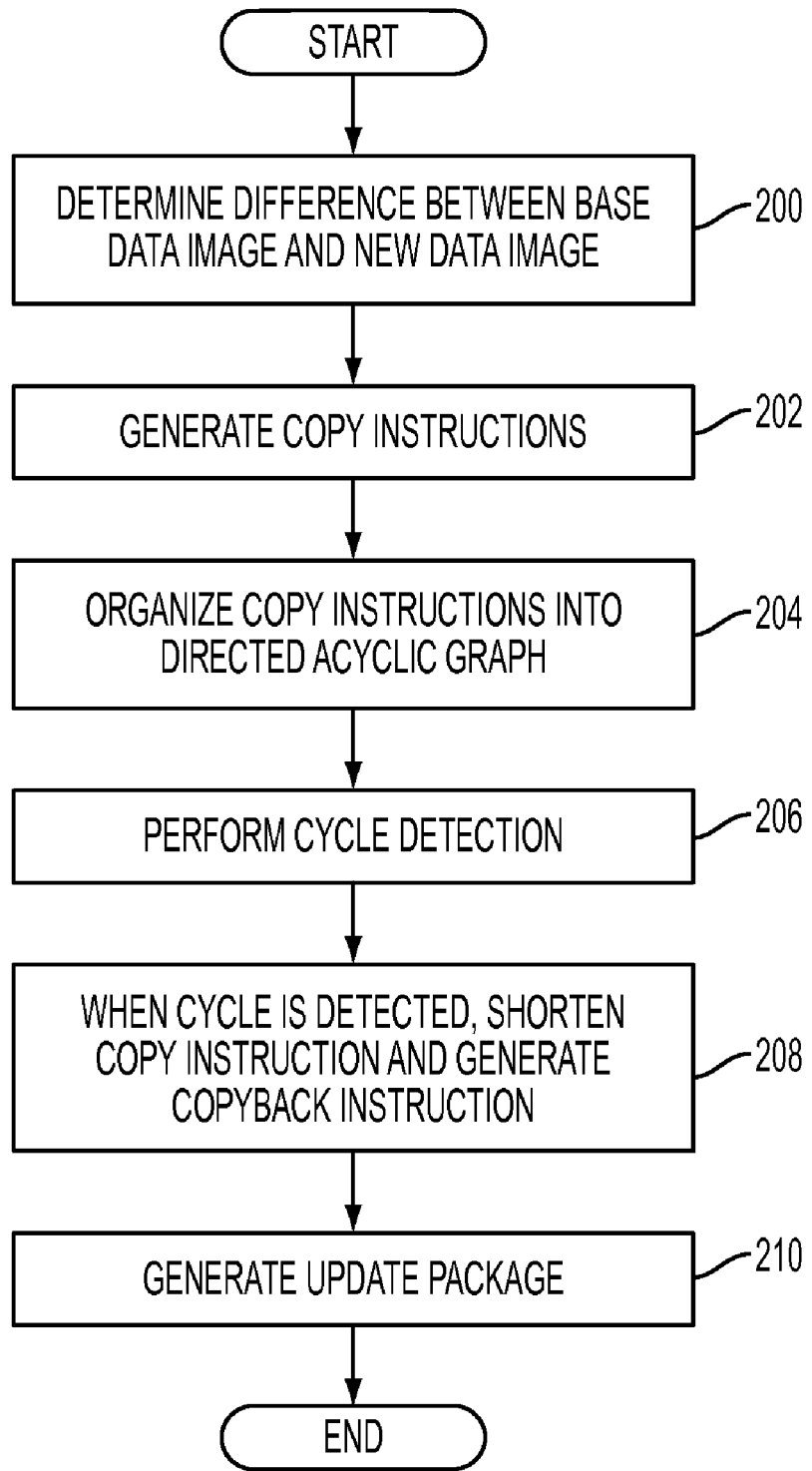
FIG. 2 is a flowchart for generating an update package according to an exemplary embodiment of the present invention.

FIG. 2 is a flowchart for generating an update package according to an exemplary embodiment of the present invention.

Referring to FIG. 2, in step 200, the BDE 118 determines differences between the base data image 120 and the new data image 122. In step 202, the update encoder 116 generates COPY instructions corresponding to respective sections of code in the base data image 120 that can be used in creating the new data image 122 by copying the respective sections of code into new data locations in the new data image 122. In step 204, the update encoder 116, organizes the COPY instructions into a directed acyclic graph. In step 206, the update encoder 116 performs cycle detection on the COPY instructions in the directed acyclic graph to detect any cycles. When a cycle is detected, the update encoder 116, in step 208, identifying a COPY instruction in the detected cycle with a smallest overlapping part, removing the overlapping part from the identified COPY instruction (by shortening the COPY instruction), and generating a COPYBACK instruction including the overlapping part removed from the identified COPY instruction. In step 210, the update encoder 116, after all cycles have been detected, generates the update package based on the COPY and COPYBACK instructions. Thereafter, the procedure ends.

A method for creating the new data image 122 from the base data image 120 using the update package 124 at the client device 150 is described below with reference to FIG. 3.

Figure 3:
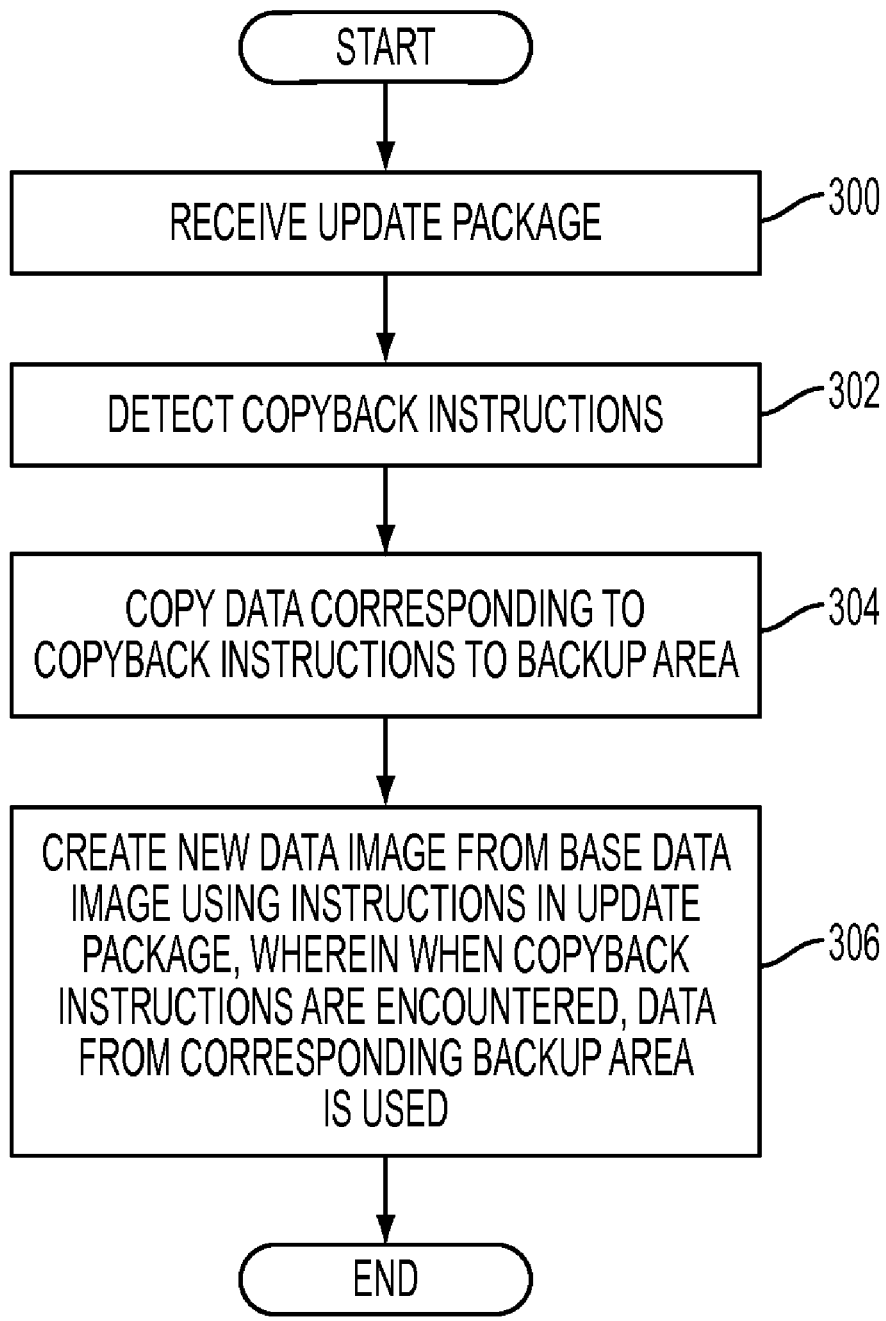
FIG. 3 is a flowchart for creating a new data image from a base data image using an update package according to an exemplary embodiment of the present invention.

FIG. 3 is a flowchart for creating a new data image from a base data image using an update package according to an exemplary embodiment of the present invention.

Referring to FIG. 3, in step 300, the download agent 152 receives the update package 124. In step 302, the update decoder 154 detects COPYBACK instructions in the update package. For each COPYBACK instruction detected, in step 304, the update decoder 154 copies data corresponding to the COPYBACK instructions to a backup area. After the data corresponding to the COPYBACK instructions is copied to the backup area, in step 306, the update decoder 154 performs operations on the base data image corresponding to the instructions included in the update package to create the new data image. Here, when a COPYBACK instruction is encountered, data from the corresponding backup area is used. Thereafter, the procedure ends.

While in certain exemplary embodiments of the present invention each COPYBACK instruction has its own unique data in the backup area, in other exemplary embodiments of the present invention, the COPYBACK instructions may re-use data in the backup area by not copying duplicate data. This could be accomplished in two different ways. The first method is to have data uniqueness ascertained by the update encoder 116 and encode into each COPYBACK instruction an offset of where to copy/read the data in the backup area. This method may increase the size of the update package 124. The second method is for the update decoder 154 to maintain a list of address ranges that have already been copied to the backup area and check this list before copying new data.

In certain exemplary embodiments of the present invention, a second style of a COPYBACK instruction may also be created that maximizes the utilization of the backup area by compressing the re-usable data to maximize the amount of data that can be preserved.

In certain exemplary embodiments of the present invention, when generating the update package 124, it is not known how much memory is available in the backup area of the client device 150. Thus, a required memory size indication corresponding to an amount of memory needed in the backup area for the update package 124 may be embedded in a header of the update package 124.

Here, upon receiving an update package 124 that includes the required memory size indication, the update decoder 154 may validate the header of the update package 124 and may generate an error if the backup area memory required by the update package 124 exceeds the available backup area memory in the client device 150. The backup area may be an extension of the save sector that is required by one or more standards to be allocated in the client device 150.

In certain exemplary embodiments of the present invention, to address the need for recovery in the event of power loss, data may only be copied to the backup area if the first sector has not been written yet. However, if the first sector has already been written, then it should be the case that all the data has been copied to the backup area prior to the interruption and thus should not be copied again, or the data may be corrupted.

In certain exemplary embodiments of the present invention, it is preferable that the backup area be in non-volatile memory. However, in other exemplary embodiments of the present invention, if it is not possible for the application of the update package 124 in the client device 150 to be interrupted, or if interruption of the application of the update package 124 in the client device 150 does not need to be considered, then the backup area may be in RAM. If the device contains battery-backed up RAM, or non-volatile RAM, then it can be used for the backup area.

In certain exemplary embodiments of the present invention, the amount of time it takes the update decoder 154 to apply the update package 124 may be reduced by reducing the number of sector writes at the expense of the size of the update package 124. This may be performed at two different steps during the generation of the update package 124. First, prior to performing the topological sort of COPY instructions, overlaps are eliminated between COPY instructions that have a length less than a threshold number. This allows the topological sort more freedom in optimizing the order of the COPY instructions. Second, when interleaving COPY and ADD instructions, ADD instructions are inserted for a particular sector as long as future COPY instructions only read less than a threshold number of bytes from the sector that overlaps with the ADD instructions. Exemplary embodiments of the present invention may be used to insert COPYBACK instructions in place of the COPY instructions affected in both of these cases. This will allow the number of sector writes to be reduced with a minimal increase in the size of the update package 124.

Exemplary embodiments of the present invention are beneficial in mitigating the need to copy entire sectors to a backup area in memory. Exemplary embodiment of the present invention mitigate the need to copy entire flash sectors to a backup area in memory by allowing for only the data that is used by the COPYBACK instructions to be copied. This allows the backup area to be used much more efficiently and allows RAW conflicts to be eliminated using a smaller amount of backup memory. A comparison between the sizes of update packages 124 for given sets of base and new data images 120 and 122, respectively, generated according to the related art and according to exemplary embodiments of the present invention, have demonstrated that update packages 124 generated according to exemplary embodiments of the present invention are up to 14% smaller than update packages 124 generated according to the related art.

Exemplary embodiments of the present invention are also beneficial in mitigating the need for a second pass when generating the update package 124. More specifically, after generating the update package 124, a second pass is not needed to generate the data to be copied to the backup area. Further, exemplary embodiments of the present invention may be accomplished during generation of the update package 124 with little modification to algorithms employed in the related art.

Certain aspects of the present invention may also be embodied as control logic stored on a computer useable medium that causes a computer to process the control logic so as to operate in a manner corresponding to the control logic. The control logic comprises one or more computer readable program code means. A computer useable medium is any data storage device that can store data, which may be thereafter read by a computer system. Examples of the computer useable medium include Read-Only Memory (ROM), Random-Access Memory (RAM), CD-ROMs, magnetic tapes, floppy disks, and optical data storage devices. The computer useable medium can also be distributed over network coupled computer systems so that the computer readable code is stored and executed in a distributed fashion. Also, functional programs, code, and code segments for accomplishing the present invention may be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for an update server to generate an update package based on a comparison between a base data image and a new data image, the update package including a set of instructions used for, in a remote client device, creating the new data image from the base data image, the method comprising:

determining, by the update server, differences between the base data image and the new data image;

generating, by the update server, COPY instructions corresponding to respective sections of code in the base data image that can be used in creating the new data image by copying the respective sections of code into new data locations in the new data image;

organizing, by the update server, the COPY instructions into a directed acyclic graph;

performing, by the update server, cycle detection on the COPY instructions in the directed acyclic graph to detect any cycles;

when a cycle is detected, identifying a COPY instruction in the detected cycle with a smallest overlapping part, removing, by the update server, the overlapping part from the identified COPY instruction, and generating a COPYBACK instruction including the overlapping part removed from the identified COPY instruction; and after all cycles have been detected, generating, by the update server, the update package based on the COPY and COPYBACK instructions.

2. The method of claim 1, further comprising, after all cycles have been detected, but before the update package is generated, organizing the COPY instructions into a directed acyclic graph and topologically sorting the COPY instructions.

3. The method of claim 2, further comprising, prior to topologically sorting the COPY instructions, eliminating overlaps between COPY instructions that have a length less than a threshold number.

4. The method of claim 1, further comprising, generating ADD instructions corresponding to respective sections of the new data image that cannot be copied from the base data image, wherein the generating of the update package is also based on the ADD instructions.

5. The method of claim 4, wherein the generating of the update package comprises interleaving at least one of the COPYBACK, COPY and ADD instructions, and wherein when the COPY and ADD instructions are interleaved, ADD instructions are inserted for a particular sector as long as future COPY instructions only read less than a threshold number of bytes from the sector that overlaps with the ADD instructions.

6. The method of claim 1, wherein the update package includes a required memory size indication, the required memory size indication indicating an amount of memory needed in a backup area of memory in the client device for the update package.

7. The method of claim 1, further comprising: determining uniqueness of the data to be copied to a backup area for each COPYBACK instruction, and for any COPYBACK instruction determined to not have unique data to be copied to the backup area, including an offset into the backup area where the data is located.

8. A method for a client device to create a new data image from a base data image based on instructions included in an update package, the method comprising:

receiving, by the client device, the update package, the update package including COPYBACK instructions and other instructions;

performing, by the client device, a first operation using the update package, the first operation comprising:

detecting COPYBACK instructions in the update package; and for each COPYBACK instruction detected, copying data corresponding to the COPYBACK instructions to a backup area; and performing, by the client device, a second operation using the update package after performing the first operation, the second operation comprising:

performing by the client device, operations on the base data image corresponding to the COPYBACK instructions and the other instructions included in the update package to create the new data image, wherein, when a COPYBACK instruction is encountered in the second operation, data is copied from the corresponding backup area to the new data image.

9. The method of claim 8, wherein an order of the data in the backup area corresponds to an order of the COPYBACK instructions within the update package.

10. The method of claim 8, the first operation further comprising:

determining if the backup area is large enough for the update package based on a required memory size indication in the update package, the required memory size indication indicating an amount of memory needed in the backup area for the update package; and if the backup area is not large enough for the update package, generating an error.

11. The method of claim 8, wherein, when performing the first operation, the copying of the data corresponding to the COPYBACK instructions to the backup area is performed only if a first sector has not been written.

12. The method of claim 8, wherein, when performing the first operation, if the COPYBACK instructions include an offset, the data corresponding to the COPYBACK instructions are not copied to the backup area.

13. The method of claim 8, wherein the data copied to the backup area is compressed.

14. An update server apparatus for generating an update package based on a comparison between a base data image and a new data image, the update package including a set of instructions used for, in a remote client device, creating the new data image from the base data image, the apparatus comprising:

at least one computer for executing a Binary Differencing Engine (BDE) and an update encoder, wherein the BDE determines differences between the base data image and the new data image, and wherein the update encoder generates COPY instructions corresponding to respective sections of code in the base data image that can be used in creating the new data image by copying the respective sections of code into new data locations in the new data image, organizes the COPY instructions into a directed acyclic graph, performs cycle detection on the COPY instructions in the directed acyclic graph to detect any cycles, when a cycle is detected, identifiers a COPY instruction in the detected cycle with a smallest overlapping part, removes the overlapping part from the identified COPY instruction, generates a COPYBACK instruction including the overlapping part removed from the identified COPY instruction, and, after all cycles have been detected, generates the update package based on the COPY and COPYBACK instructions.

15. A client device apparatus for creating a new data image from a base data image based on instructions included in an update package, the apparatus comprising:

at least one controller for executing a download agent and an update decoder, wherein the download agent receives the update package, the update package including COPYBACK instructions and other instructions, wherein the update decoder performs a first operation using the update package, the first operation including detecting COPYBACK instructions in the update package, and copying data corresponding to the COPYBACK instructions to a backup area for each COPYBACK instruction detected, wherein the update decoder performs a second operation using the update package after performing the first operation, the second operation including performing operations on the base data image corresponding to the COPYBACK instructions and the other instructions included in the update package to create the new data image, and wherein, when a COPYBACK instruction is encountered in the second operation, data is copied from the corresponding backup area to the new data image.

16. The apparatus of claim 15, wherein an order of the data in the backup area corresponds to an order of the COPYBACK instructions within the update package.

17. The apparatus of claim 15, wherein, when performing the first operation, the update decoder determines if the backup area is large enough for the update package based on a required memory size indication in the update package, the required memory size indication indicating an amount of memory needed in the backup area for the update package, and if the backup area is not large enough for the update package, the update decoder generates an error.

18. The apparatus of claim 15, wherein, when performing the first operation, the update decoder only copies the data corresponding to the COPYBACK instructions to the backup area if a first sector has not been written.

19. The apparatus of claim 15, wherein, when performing the first operation, if the COPYBACK instructions include an offset, the update decoder data does not copy the data corresponding to the COPYBACK instructions to the backup area.

20. The apparatus of claim 15, wherein the update decoder compresses the data copied to the backup area.

21. A computer program product comprising a non-transitory computer usable medium having control logic stored therein for causing a computer to generate an update package based on a comparison between a base data image and a new data image, wherein the update package includes a set of instructions used for, in a remote client device, creating the new data image from the base data image, the control logic comprising:

a first computer readable program code means for causing the computer to determine differences between the base data image and the new data image;

a second computer readable program code means for causing the computer to generate COPY instructions corresponding to respective sections of code in the base data image that can be used in creating the new data image by copying the respective sections of code into new data locations in the new data image;

a third computer readable program code means for causing the computer to organize the COPY instructions into a directed acyclic graph;

a fourth computer readable program code means for causing the computer to perform cycle detection on the COPY instructions in the directed acyclic graph to detect any cycles;

a fifth computer readable program code means for causing the computer to, when a cycle is detected, identify a COPY instruction in the detected cycle with a smallest overlapping part, remove the overlapping part from the identified COPY instruction, and generate a COPYBACK instruction including the overlapping part removed from the identified COPY instruction; and a sixth computer readable program code means for causing the computer to, after all cycles have been detected, generate the update package based on the COPY and COPYBACK instructions.

22. The computer program product of claim 21, the control logic further comprising a seventh computer readable program code means for causing the computer to, after all cycles have been detected, but before the update package is generated, organize the COPY instructions into a directed acyclic graph and topologically sort the COPY instructions.

23. The computer program product of claim 22, the control logic further comprising an eighth computer readable program code means for causing the computer to, prior to topologically sorting the COPY instructions, eliminate overlaps between COPY instructions that have a length less than a threshold number.

24. The computer program product of claim 21, the control logic further comprising an ninth computer readable program code means for causing the computer to, generate ADD instructions corresponding to respective sections of the new data image that cannot be copied from the base data image, wherein the generating of the update package by the sixth computer readable program code means is also based on the ADD instructions.

25. The computer program product of claim 24, wherein the sixth computer readable program code means further causes the computer to interleave at least one of the COPYBACK, COPY and ADD instructions, and wherein when the COPY and ADD instructions are interleaved, ADD instructions are inserted for a particular sector as long as future COPY instructions only read less than a threshold number of bytes from the sector that overlaps with the ADD instructions.

26. The computer program product of claim 21, wherein the sixth computer readable program code means further causes the computer to include a required memory size indication in the update package, the required memory size indication indicating an amount of memory needed in the backup area of memory in the client device for the update package.

27. The computer program product of claim 21, the control logic further comprising an ninth computer readable program code means for causing the computer to determine uniqueness of the data to be copied to the backup area for each COPYBACK instruction, and for any COPYBACK instruction determined to not have unique data to be copied to the backup area, include an offset into the backup area where the data is located.

28. A computer program product comprising a non-transitory computer usable medium having control logic stored therein for causing a computer to create a new data image from a base data image based on instructions included in an update package, the control logic comprising:

a first computer readable program code means for causing the computer to receive the update package, the update package including COPYBACK instructions and other instructions;

a second computer readable program code means for causing the computer to performing a first operation using the update package, the first operation comprising:

detecting COPYBACK instructions in the update package; and for each COPYBACK instruction detected, copying data corresponding to the COPYBACK instructions to a backup area; and a third computer readable program code means for causing the computer to perform a second operation using the update package after performing the first operation, the second operation comprising:

performing operations on the base data image corresponding to the COPYBACK instructions and the other instructions included in the update package to create the new data image, wherein, when a COPYBACK instruction is encountered in the second operation, data is copied from the corresponding backup area to the new data image.

* * * * *